(12) United States Patent
Leemans et al.

(10) Patent No.: US 11,346,608 B2
(45) Date of Patent: May 31, 2022

(54) HEAT EXCHANGER WITH IMPROVED PLUGGING RESISTANCE

(71) Applicant: Deere & Company, Moline, IL (US)

(72) Inventors: Ronald A. Leemans, Coal Valley, IL (US); Gregory R. Gessel, Bettendorf, IA (US)

(73) Assignee: Deere & Company, Moline, IL (US)

( * ) Notice: Subject to any disclaimer, the term of this patent is extended or adjusted under 35 U.S.C. 154(b) by 423 days.

(21) Appl. No.: 15/010,706

(22) Filed: Jan. 29, 2016

(65) Prior Publication Data

US 2017/0219291 A1 Aug. 3, 2017

(51) Int. Cl.
| | |
|---|---|
| *F28F 3/00* | (2006.01) |
| *F28D 1/02* | (2006.01) |
| *F28F 19/00* | (2006.01) |
| *F28F 1/12* | (2006.01) |
| *F28D 1/03* | (2006.01) |
| *F28D 1/053* | (2006.01) |
| *F28F 3/06* | (2006.01) |
| *F28F 3/02* | (2006.01) |
| *B23P 15/26* | (2006.01) |

(52) U.S. Cl.
CPC ............ *F28D 1/0233* (2013.01); *B23P 15/26* (2013.01); *F28D 1/0366* (2013.01); *F28D 1/0535* (2013.01); *F28D 1/05366* (2013.01); *F28F 1/126* (2013.01); *F28F 3/025* (2013.01); *F28F 3/06* (2013.01); *F28F 19/00* (2013.01); *F28F 2255/16* (2013.01); *F28F 2275/14* (2013.01)

(58) Field of Classification Search
CPC .... F28D 9/0062; F28D 9/0068; F28D 1/0308; F28D 1/02; F28D 1/053; F28D 1/0233; F28D 1/0535; F28D 1/05366; F28D 1/0366; F28F 2275/04; F28F 3/06; F28F 1/126; F28F 19/00; F28F 3/025; F28F 2255/16; F28F 2275/14; B23P 15/26
USPC ......................................................... 165/166
See application file for complete search history.

(56) References Cited

U.S. PATENT DOCUMENTS

| | | | | |
|---|---|---|---|---|
| 1,613,253 | A | * | 1/1927 | Stolp .................... F28D 1/0316 165/153 |
| 1,972,706 | A | * | 9/1934 | Engelman ................. F28F 1/30 123/41.67 |
| 2,573,538 | A | * | 10/1951 | Brown, Jr. ................ F28F 3/02 165/170 |
| 2,874,941 | A | * | 2/1959 | Woofard et al. .......... F28F 3/02 165/150 |

(Continued)

FOREIGN PATENT DOCUMENTS

| | | | |
|---|---|---|---|
| CN | 203116583 U | 5/2014 | |
| DE | 19505641 A1 * | 8/1996 | ............. D06F 58/20 |

(Continued)

*Primary Examiner* — Harry E Arant
(74) *Attorney, Agent, or Firm* — Christopher R. Christenson; Kelly, Holt & Christenson, PLLC

(57) ABSTRACT

A heat exchanger assembly includes a first heat exchange fluid conduit and at least one fin. The first heat exchange fluid conduit defines a passageway therethrough and is configured to receive a flow of a first heat exchange fluid. At least one fin is disposed to receive a flow of a second heat exchange fluid. The fin(s) is/are coupled to the heat exchange fluid conduit at an interface that is configured to reduce accumulation of debris entrained in the second heat exchange fluid.

20 Claims, 8 Drawing Sheets

(56) References Cited

U.S. PATENT DOCUMENTS

| | | | | |
|---|---|---|---|---|
| 2,981,520 | A * | 4/1961 | Chadburn | F28F 1/045 |
| | | | | 165/168 |
| 3,250,325 | A * | 5/1966 | Rhodes et al. | F28F 1/128 |
| | | | | 165/153 |
| 3,528,496 | A * | 9/1970 | Kun | F28F 3/02 |
| | | | | 165/166 |
| 4,203,490 | A * | 5/1980 | Terai | F28F 1/12 |
| | | | | 165/134.1 |
| 4,804,041 | A * | 2/1989 | Hasegawa et al. | F28D 1/0366 |
| | | | | 165/166 |
| 5,490,559 | A * | 2/1996 | Dinulescu | F28B 1/06 |
| | | | | 165/148 |
| 5,816,320 | A | 10/1998 | Arnold et al. | |
| 5,819,407 | A * | 10/1998 | Terada | B21K 25/00 |
| | | | | 29/890.03 |
| 7,182,125 | B2 * | 2/2007 | Martin et al. | F28D 1/0383 |
| | | | | 165/109.1 |
| 7,810,552 | B2 | 10/2010 | Slaughter | |
| 8,146,651 | B2 * | 4/2012 | Unger | F28D 1/05366 |
| | | | | 123/41.57 |
| 2003/0070795 | A1 * | 4/2003 | Gievers et al. | F28D 9/0068 |
| | | | | 165/166 |
| 2009/0242180 | A1 * | 10/2009 | Gonzales | B21C 37/151 |
| | | | | 165/153 |
| 2014/0033534 | A1 * | 2/2014 | Wintersteen | B23K 1/0012 |
| | | | | 29/890.047 |
| 2015/0292817 | A1 * | 10/2015 | Shimanuki | F28F 3/025 |
| | | | | 165/173 |

FOREIGN PATENT DOCUMENTS

| | | | |
|---|---|---|---|
| JP | S5523889 A * | 2/1980 | |
| WO | 2012026823 A1 | 3/2012 | |
| WO | 2014015418 A1 | 1/2014 | |
| WO | 2014065355 A1 | 5/2014 | |

* cited by examiner

HEAT EXCHANGER WITH IMPROVED PLUGGING RESISTANCE

FIELD OF THE DESCRIPTION

The present description relates to heat exchangers. More specifically, the present description relates to heat exchangers that rely on airflow therethrough.

BACKGROUND

Heat exchangers are used in a variety of devices and machines in order to transfer heat from one medium or fluid to another. One particular example of a heat exchanger is a cooler in which a liquid used by a machine or device is heated via use of the device and must be cooled. The liquid may be brought into the heat exchanger and another fluid, such as air, at a lower temperature may flow through the heat exchanger. The two heat exchange fluids are isolated from one another, but thermal interaction (e.g. heat flow) is generated in order to allow (in the case of a cooler) the air to receive and carry away heat from the liquid. As can be appreciated, heat exchangers are common in a variety of machines or structures including automobiles (for example, radiators, heater cores, engine oil coolers, transmission fluid coolers), residences (for example, central air units), agricultural and construction work machines (for example, radiators, transmission fluid coolers, engine oil coolers, hydraulic fluid coolers, etc.).

There are at least two different types of heat exchangers that are commonly in use. The first type is termed "tube and fin" and commonly includes the type of heat exchanger found in an automobile radiator. In a tube and fin heat exchanger, liquid flows through a number of flattened tubes while air flows through a number of fins that separate the flattened tubes. A second type of heat exchanger is termed a "bar plate" heat exchanger. In a bar plate heat exchanger, a number of flat bars fluidically isolate but thermally couple one heat flow medium from the other. For example, an internal fluid may flow through one layer of a bar plate heat exchanger being bounded by a pair of flat thermally conductive bars. On opposite sides of each bar, a layer of air fins may be coupled. Liquid flowing through the liquid layer of a bar plate heat exchanger generally flows in a first direction while external air flow is generally perpendicular to the flow direction of the liquid.

In many types of heat exchangers, such as those described above, the effectiveness of the heat exchanger is directly related to the ability of the heat exchange fluids to flow through the device. For example, in the event that air flow through the fins is obstructed, the ability of the heat exchanger to cool liquid flowing through the heat exchanger will be reduced.

The discussion above is merely provided for general background information and is not intended to be used as an aid in determining the scope of the claimed subject matter.

SUMMARY

A heat exchanger assembly includes a first heat exchange fluid conduit and at least one fin. The first heat exchange fluid conduit defines a passageway therethrough and is configured to receive a flow of a first heat exchange fluid. At least one fin is disposed to receive a flow of a second heat exchange fluid. The fin(s) is/are coupled to the heat exchange fluid conduit at an interface that is configured to reduce accumulation of debris entrained in the second heat exchange fluid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Heat exchangers that operate in debris laden air environments are prone to collect and trap debris as air passes through them. Over time, the heat exchanger, for example, a cooler, plugs fully, or at least partially, resulting in reduced air flow and associated loss in heat transfer effectiveness. This loss in heat transfer can cause failure or loss of function of the machine that requires cooling. It is believed that some aspects of current designs that use rolled air fins and/or tube and fin construction generally include features that are the root cause or at least facilitate such plugging.

Embodiments described herein generally provide a heat exchanger that is resistant to the accumulation of debris on the air side. A cooler can be plugged externally by laying a mat of material over the air channel openings. To avoid external plugging, the air channels are provided with a hydraulic diameter that is larger than the largest debris length. Coolers that have smaller openings than this requirement can be protected with fine screens placed in front of the cooler. Embodiments described herein generally focus on the air-side of the heat exchanger and are specifically focused upon reducing or eliminating internal geometries that facilitate and/or generate internal plugging. Air-side internal plugging generally begins when air-side channel gaps and crevices have sizes and geometries that may catch and retain debris. Once such plugging begins, it will generally continue. Over time, this results in an internal composite debris gauze that fills in the air channel cross-section and blocks its air flow.

Figure 1:
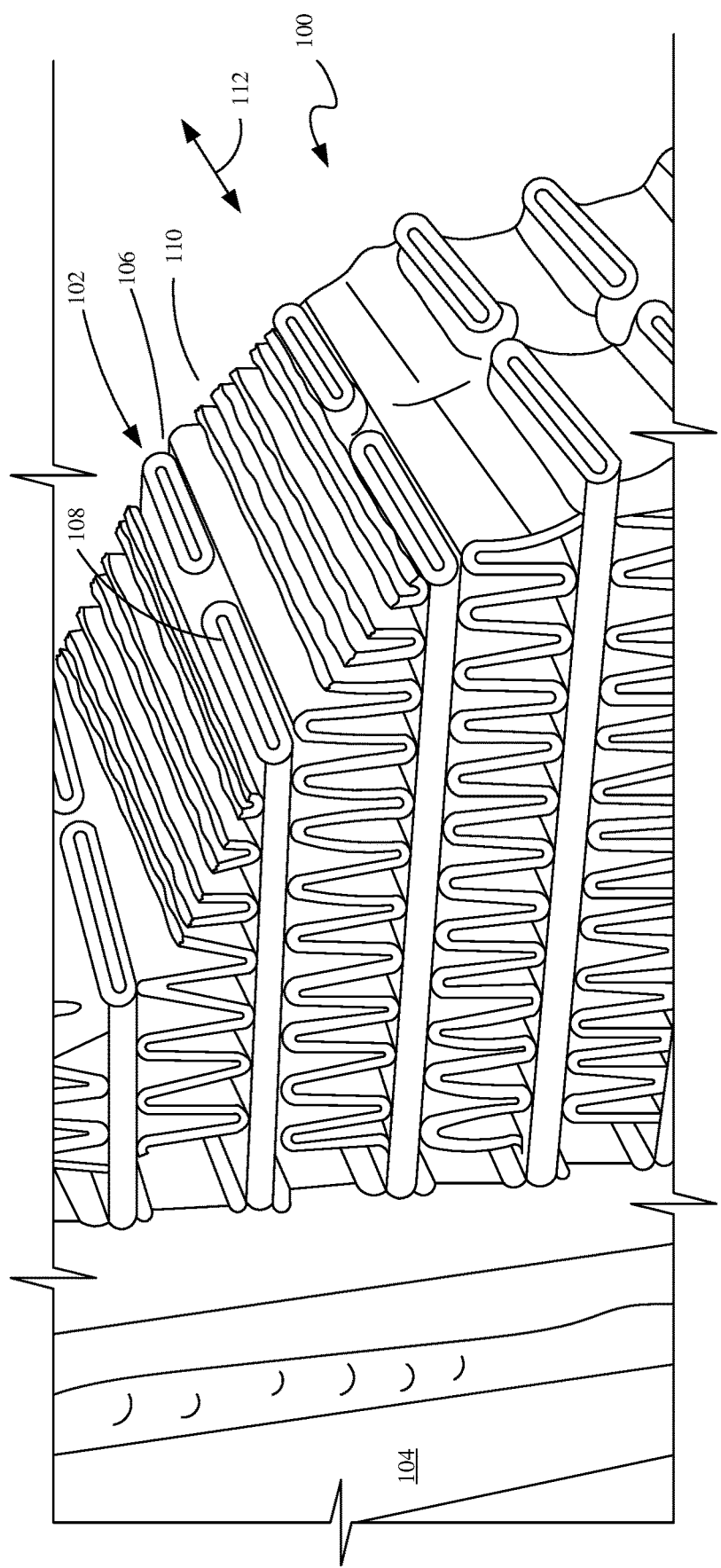
FIG. 1 is a diagrammatic view of a tube and fin construction heat exchanger, with which embodiments of the present invention can be practiced.

FIG. 1 is a diagrammatic view of a tube and fin construction heat exchanger. In heat exchanger 100, a row of tubes 102 is fluidically connected to a header 104 which is designed to contain heat transfer liquid. Row 102 is formed by a pair of flattened tubes 106, 108 and generally flows away from header 104 to a similar structure on an opposite end of tubes 106, 108. A number of rows 102 are provided along header 104 to create heat exchanger 100. In the example shown in FIG. 1, tubes 106, 108 are cut in order to show an internal geometry of the heat exchanger. In reality, all tubes shown in FIG. 1 would extend completely from header 104 to the opposite header structure. Fluid would flow between the two headers through the flattened tubes 106, 108.

Figure 2A:
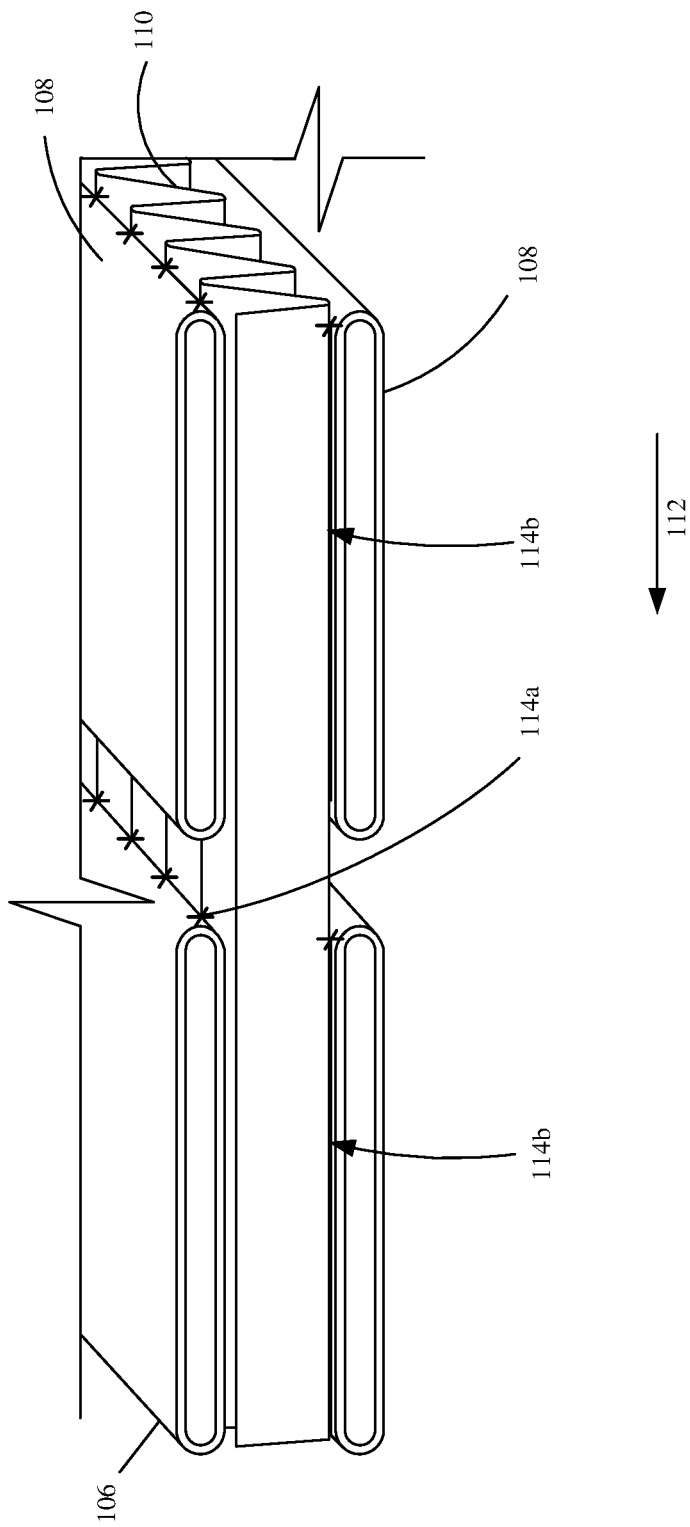
FIG. 2A is a diagrammatic enlarged view of a portion of the heat exchanger shown in FIG. 1.
Figure 2B:
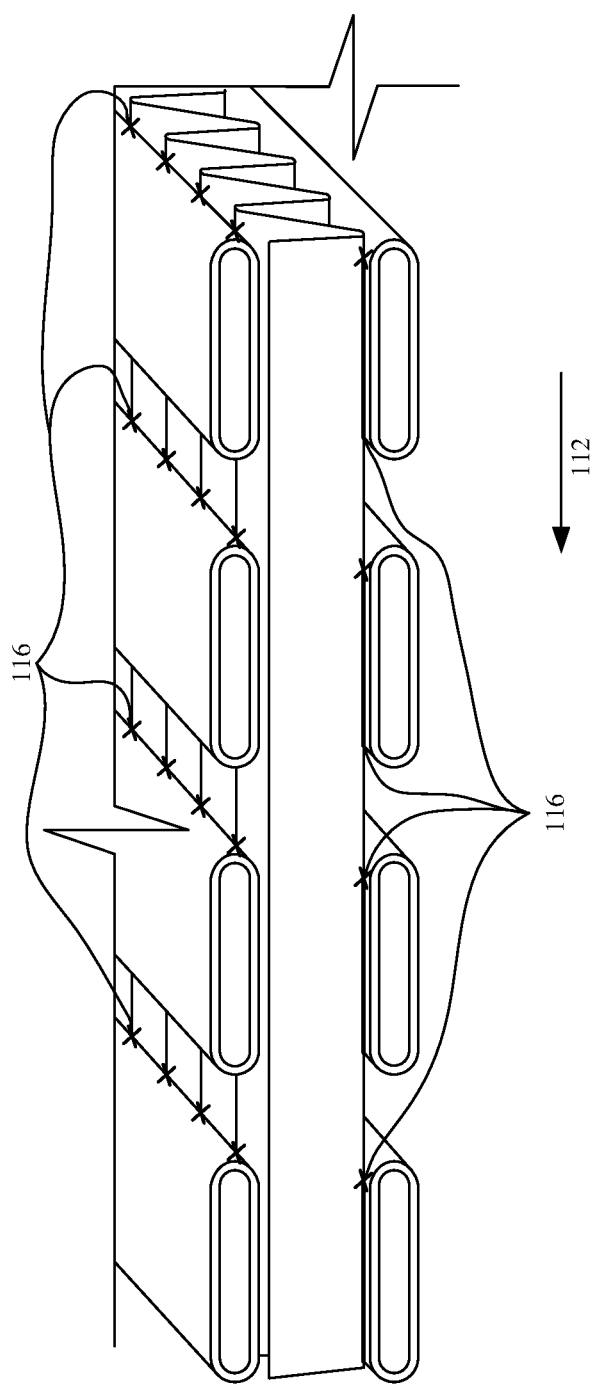
FIG. 2B is a diagrammatic view of a four-row tube and fin heat exchanger showing three distinct areas where debris accumulates.

A number of V-fins 110 are fluidically isolated from, but thermally coupled to, tubes 106, 108. The V-fins 110 allow airflow therethrough in the direction of arrow 112. As air flows through the V-fins 110 in the direction of arrow 112, the air contacts V-fins 110 and receives the heat flow. As can be seen in FIG. 1, the corners of V-fins 110 are mechanically coupled to the side walls of tubes 106, 108. This mechanical coupling also provides the thermal coupling between V-fins 110 and tubes 106, 108. The example shown in FIG. 1 is referred to, at least in automotive context, as a two-row radiator. FIG. 2A is a diagrammatic enlarged view of the two-row radiator shown in FIG. 1. It has been observed that tube and fin construction-based heat exchangers generally accumulate debris in the area 114a between tubes and along the soldered edges of the fins, indicated at reference numeral 114b. FIG. 2B is a diagrammatic view of a four-row tube and fin heat exchanger showing four distinct areas 116 where debris accumulates. Based upon observation of debris accumulation, it is known that the crevices generated in the areas where the tubes are coupled to the V-fins were of such size and orientation relative to the air flow that debris would begin accumulating there.

Figure 3:
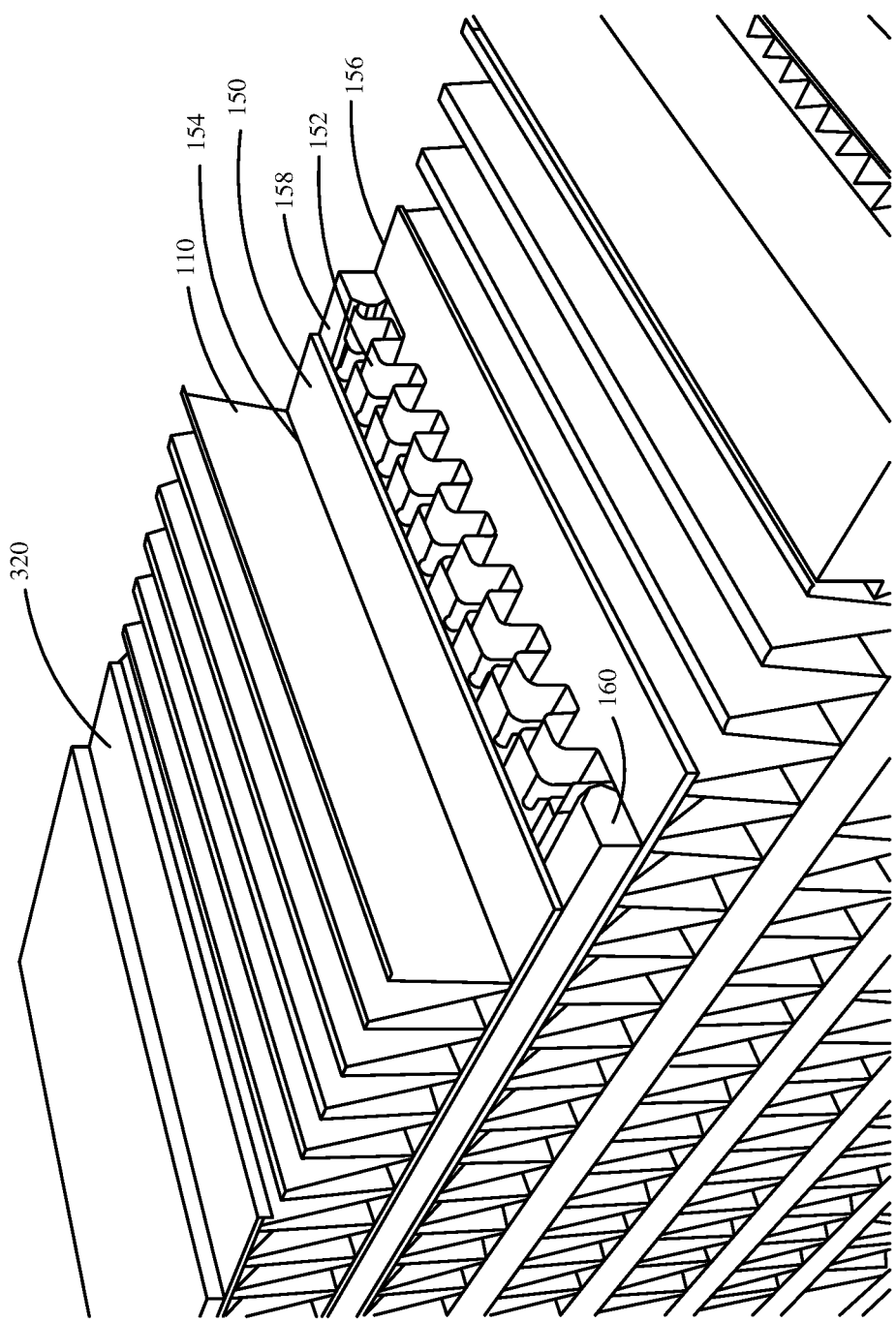
FIG. 3 is a diagrammatic view of a bar plate construction-based heat exchanger with which embodiments described herein are particularly applicable.

FIG. 3 illustrates a bar plate construction-based heat exchanger with which embodiments described herein are particularly applicable. In a bar plate construction, the picket fence array of tubes that are used in tube and fin construction is replaced with a single rectangular cross-sectional tube. Bar 150 is internally divided into channels by inserting a corrugated fin sheet 152. This effectively eliminates the gaps between tubes that catch debris on tube and fin designs. However, current bar and plate designs have another internal crevice that can sometimes accumulate debris. In the example shown in FIG. 3, this crevice occurs where V-fin 110 is coupled to bar 150 at interface 154. The crevice at interface 154 is caused by the fin sheet geometry rolling into the attachment point with bar 150. Rolling fin interface 154 results in a finite radius at each bend of fin 110, and these radii create a joint (j-groove joints) where the sheet is attached to the bars. Excessive solder can also catch debris at interface 154. These crevices catch and lodge the debris. In order to eliminate this source of debris accumulation, at least one embodiment of the present invention generally provides an interface where the crevice is eliminated. The crevice can be eliminated by filling in the space with brazing or some other suitable material. It is preferred that the interface be filled in with brazing as such material increases the thermal contact between the plate and the fin. However, the interface can be filled in by other suitable materials as well, including non-heat conductive materials. Additionally, embodiments of the present invention, which will be described in further detail below, can provide a joint between a fin and plate or tube that does not have any crevice in the first place.

As shown in FIG. 3, a heat exchange fluid conduit is created by two adjacent bars 150, 156 and endcaps 158, 160 that cooperate to provide a passageway therethrough that is configured to receive a flow of a first heat exchange fluid, such as a liquid coolant. Within the fluid flow passageway defined by plates 150, 156 and endcaps 158, 160, an internal corrugated fin sheet 152 divides the chamber into a number of channels. This helps increase heat transfer between the fluid flowing therein and air flowing through fins 110.

Figure 4A:
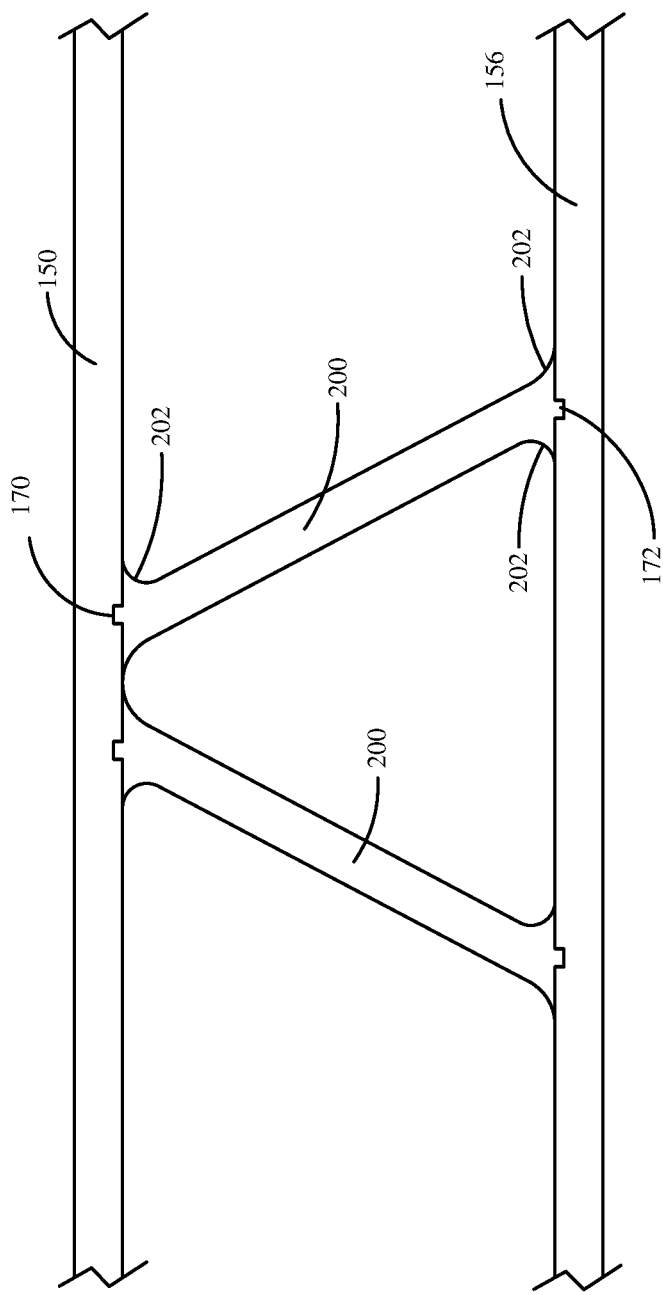
FIG. 4A is a diagrammatic cross-sectional view of a portion of a V-fin assembly disposed between a pair of plates of a bar plate construction-based heat exchanger in accordance with an embodiment of the present invention.

FIG. 4A is a diagrammatic cross-sectional view of a portion of a V-fin assembly disposed between a pair of plates of a bar plate construction-based heat exchanger in accordance with an embodiment of the present invention. Plates 150, 156, in the embodiment shown in FIG. 4A include slots 170 that are configured to receive tabs 172 of V-fins 200. As shown in FIG. 4A, each of V-fins 200 includes a fillet 202 that has a radius of curvature selected to be larger than the largest dimension of debris expected to entrained in the air. In the embodiment shown in FIG. 4A, the fillet may be manufactured with V-fins 200 and the individual fins 200 can be attached to the respective plates 150, 156 via solder joints, or other suitable methods. Further, it can be appreciated that since the cross-section of each individual V-fin 200 is constant, V-fins 200 can be manufactured by extrusion. Further, it is expressly contemplated that the entire bar/V-fin assembly, or entire heat exchangers, could be manufactured in an additive manufacturing process, such as 3-D printing. Further still, in alternative embodiments, the plate and V-fin assembly itself could be entirely manufactured as a complex extrusion, or generated via an additive manufacturing process, such as 3-D printing.

Figure 4B:
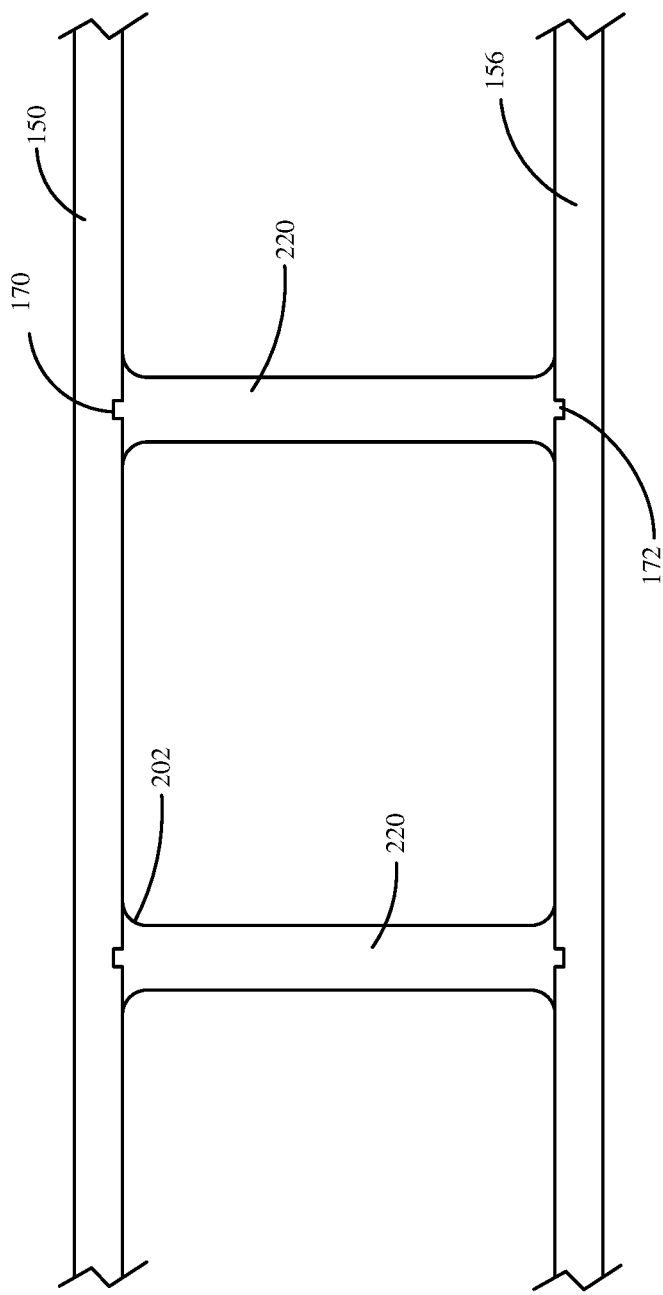
FIG. 4B is a diagrammatic cross-sectional view of a portion of a bar-pate construction type heat exchanger in accordance with another embodiment of the present invention.

FIG. 4B is a diagrammatic cross-sectional view of a portion of a bar-pate construction type heat exchanger in accordance with another embodiment of the present invention. In the embodiment shown in FIG. 4B, each of plates 150, 156 still includes slots 170, 172. However, slots 170, 172 are spaced regularly and fins 220 extend substantially perpendicularly from plates 150, 156. Accordingly, embodiments of the present invention can be practiced with fins, such as V-fins 200, perpendicular fins, such as fins 220, or any combination thereof. However, perpendicular fins 220, as shown in FIG. 4B, also include fillets 202 that are sized to inhibit the accumulation of debris as air flows along fins 220. The fillets 202 of fins 220 are substantially symmetrical. As can be seen, each of fillets 202 has a center of curvature that is disposed within the airflow region. This is in contrast to geometries where a V-fin is attached to a tube and the curvature of the V-fin and tube interface generates an increasingly small gap between the V-fin and the tube. In contrast, no such small gaps or crevices are found at the interface between fins 200 or 220 and their respective bar plates. Additionally, whether by virtue of heat exchanger design, or manufacturing, it is preferred that the joint between each fin and plate be substantially continuous in order to ensure uninterrupted airflow along the fin. Any interruptions or discontinuities of the interface creates a potential source upon which debris can be begin to become accumulated. As set forth above, once such accumulation begins, it will typically continue.

Figure 4C:
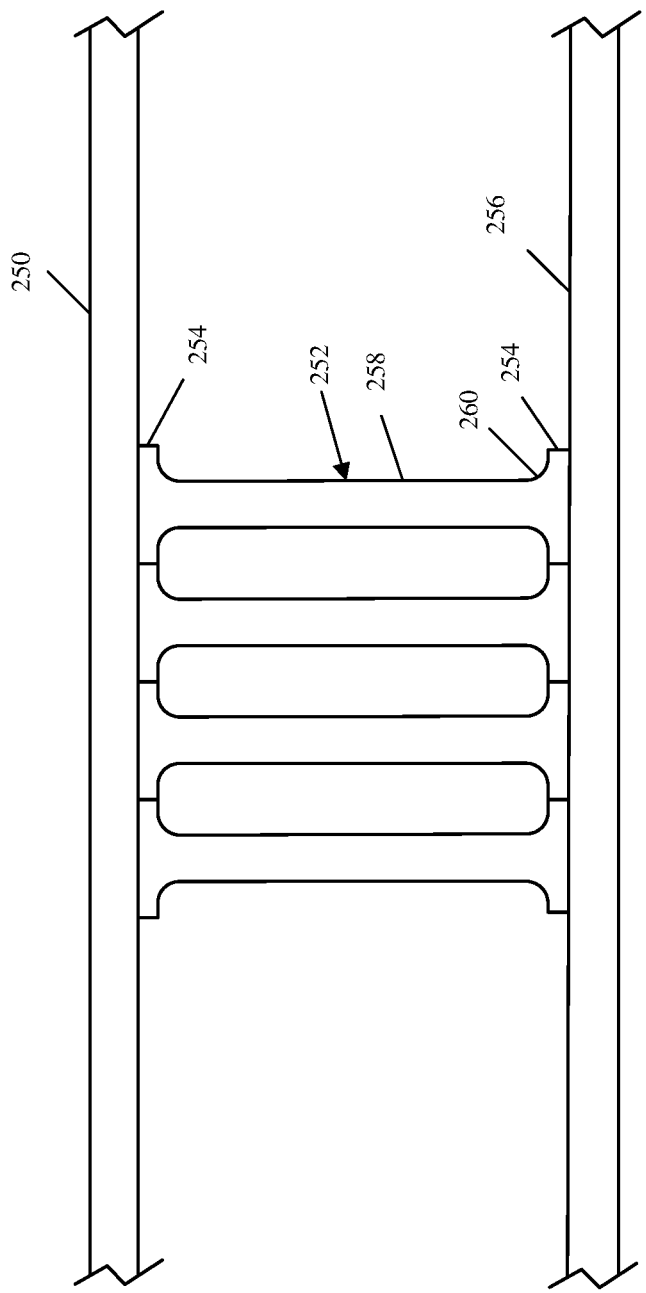
FIG. 4C is a diagrammatic cross-sectional view of a portion of a bar-pate construction type heat exchanger in accordance with another embodiment of the present invention.

FIG. 4C is a diagrammatic cross-sectional view of a portion of a bar-pate construction type heat exchanger in accordance with another embodiment of the present invention. In the embodiment shown in FIG. 4C, plates 250 and 256 do not have any slots or other surface features. Instead, fins 252 are simply soldered, or otherwise attached, between each of plates 250 and 256. As can be seen, individually-extruded fins 252 are arranged such that their base portions 254 define the spacing between fins 252. It should be noted, in at least some embodiments, fins are rolled or otherwise processed in order to produce the desired waves, or other shapes, for effective heat transfer. Base portion 254 of each fin 252 meets the central portion 258 at a fillet 260 that is configured to inhibit, or at least reduce, debris accumulation. While the embodiment shown in FIG. 4C shows base portions 254 adjacent one another, it is expressly contemplated that embodiments can include spacing between base portions 254. In such embodiments, fillet 260 may extend smoothly from central portion 258 directly to each respective plate.

While embodiments of the present invention have been described with respect to a bar-plate construction type heat exchanger, it is expressly contemplated that embodiments of the present invention can be practiced with any type of heat exchanger. In particular, embodiments of the present invention are applicable to and can improve tube and fin construction-type heat exchangers. Further still, the understanding of entrained debris accumulation from air in a heat exchanger in small crevices and the remedy of such design with fillets and/or other methods of filling in such small crevices can be practiced with various designs.

Figure 5:
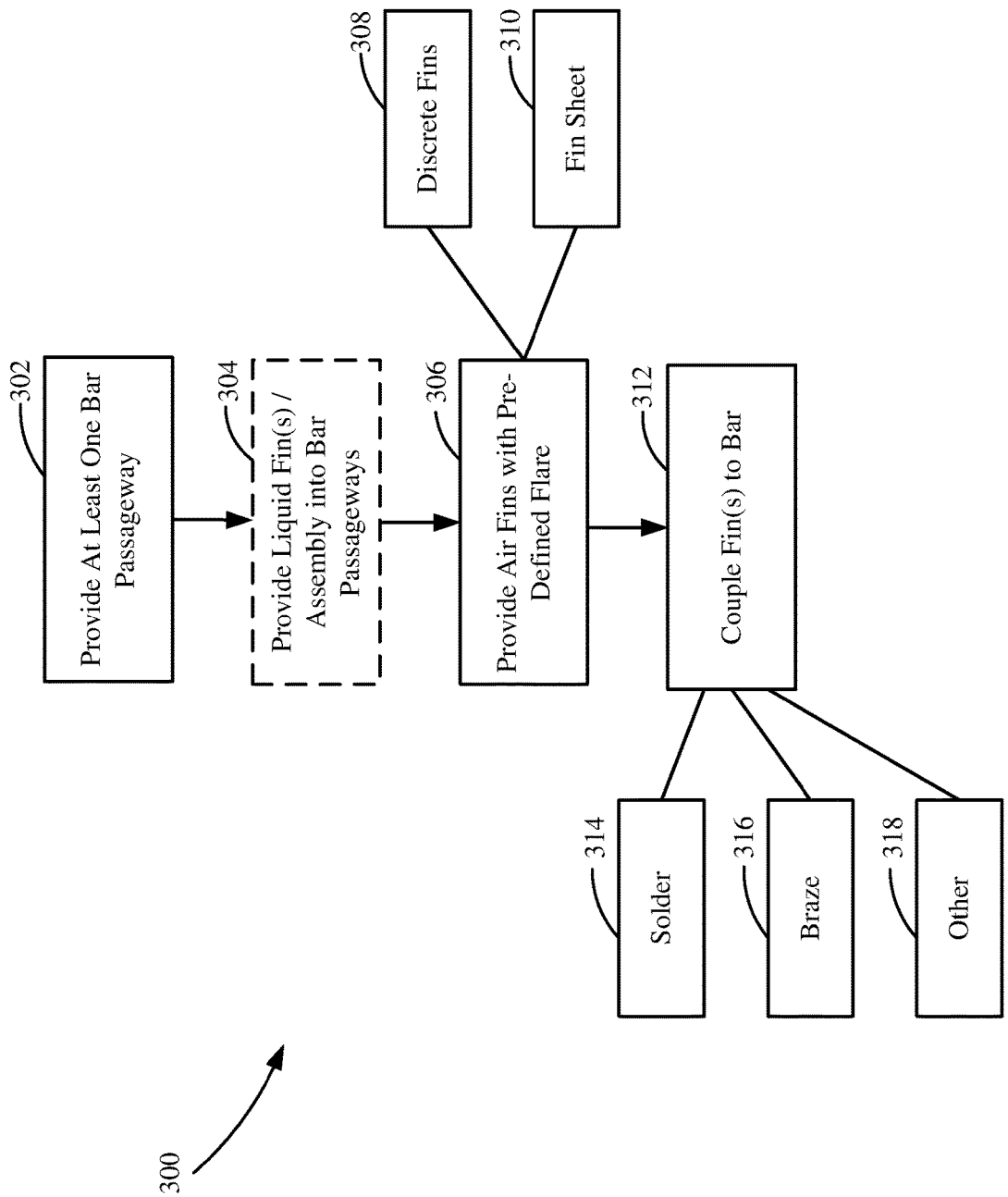
FIG. 5 is a flow diagram of a method of creating a heat exchanger in accordance with an embodiment of the present invention.

FIG. 5 is a flow diagram of a method of creating a heat exchanger in accordance with an embodiment of the present invention. Method 300 begins at block 302 where at least one bar passageway is provided. A bar passageway includes a pair of plates and endcaps, such as plates 150, 156 and endcaps 158, 160 (shown in FIG. 3) arranged to define a passageway for heat exchange liquid to flow therethrough. In some embodiments, multiple such flow passageways may be provided to provide larger to more complex heat exchangers. Next, at block 304, fins or fins sheets, such as fin sheet 152 (shown in FIG. 3), may be inserted or otherwise provided within each bar passageway. Next, at block 306, a number of air fins are provided, where each fin has a pre-defined flare proximate a location where it couples to a bar. The pre-defined flare (as shown in FIGS. 4A and 4B) transitions from the relatively thin fin portion that spans most of the distance between the plates, to a curved portion 202 of increasing cross section as the curved portion nears the interface with the plate. In some embodiments, a plurality of discrete fins 308 can be arranged between opposing plates. However, it is also contemplated that embodiments of the present invention can be practiced where a single fin sheet assembly 310 having multiple fin portions is provided between the opposing plates. In such case, each fin portion will still include a pre-defined flare. In some embodiments, each fin or fin portion may also include a tab that may be received in a corresponding slot in the plate. Alternatively, each fin or fin portion may also include a slot that received a tab provided on each plate. Regardless, embodiments of the present invention may include tab/slot arrangements between the fins and plates in order to set forth pre-defined positions for the fins as well as increase the thermal coupling between the fins and the plates and generating a more robust physical coupling. At block 312, the fins or sheet of fin portions are coupled to the bar passageway. This can be done in any suitable manner including soldering 314, brazing 316, or other methods 318. If soldering 314 is employed, it is contemplated that a strip or portion of solder may be adhered or otherwise provided within a slot, and then caused to liquefy and flow during a step in which heat is applied to the entire assembly, such as in an oven. Additionally, ends of the heat exchanger that include fins that are not coupled to bar passageways may be coupled to plates or sheets, such as parting sheet 320 (shown in FIG. 3) in order to protect the fins from damage and to securely mount both sides of the fins.

It should also be noted that the different embodiments described herein can be combined in different ways. That is, parts of one or more embodiments can be combined with parts of one or more other embodiments. All of this is contemplated herein.

Example 1 is a heat exchanger assembly that includes a first heat exchange fluid conduit and at least one fin. The first heat exchange fluid conduit defines a passageway therethrough and is configured to receive a flow of a first heat exchange fluid. At least one fin is disposed to receive a flow of a second heat exchange fluid. The fin(s) is/are coupled to the heat exchange fluid conduit at an interface that is configured to reduce accumulation of debris entrained in the second heat exchange fluid.

Example 2 is the heat exchanger of any or all previous examples and further comprising a second heat exchange fluid conduit defining a passageway therethrough, and wherein the at least one fin is coupled to the first and second heat exchange fluid conduits.

Example 3 is the heat exchanger of any or all previous examples wherein the first heat exchange conduit is formed by a pair of opposing plates and a pair of endcaps.

Example 4 is the heat exchanger of any or all previous examples and further comprising a fins sheet disposed within the first heat exchange fluid conduit to create a plurality of channels therein.

Example 5 is the heat exchanger of any or all previous examples wherein the at least one fin comprises a plurality of fins each having an interface with the first heat exchange fluid conduit that is configured to reduce accumulation of debris entrained in the second heat exchange fluid.

Example 6 is the heat exchanger of any or all previous examples wherein the plurality of fins comprise V-fins attached to the first heat exchange fluid conduit.

Example 7 is the heat exchanger of any or all previous examples wherein each V-fin has a continuous interface with the first heat exchange fluid conduit.

Example 8 is the heat exchanger of any or all previous examples wherein each V-fin has a fillet at its interface with the first heat exchange fluid conduit.

Example 9 is the heat exchanger of any or all previous examples wherein the plurality of V-fins are soldered to the first heat exchange conduit.

Example 10 is the heat exchanger of any or all previous examples wherein each V-fin has a tab that is configured to be received in a cooperative slot of the first heat exchange fluid conduit.

Example 11 is the heat exchanger of any or all previous examples wherein each V-fin has a slot that is configured to receive in a cooperative slot of the first heat exchange fluid conduit.

Example 12 is the heat exchanger of any or all previous examples wherein the at least one fin comprises a fin sheet having a plurality of fin portions each being coupled to the first heat exchange fluid conduit at a pre-defined flare portion.

Example 13 is a fin for a heat exchanger. The fin has a first end having a pre-defined flared portion and a second end having a pre-defined flared portion. A fin portion extends from the first end to the second end.

Example 14 is the fin of any or all previous examples wherein the pre-defined flared portions of the first and second ends are symmetrical.

Example 15 is the fin of any or all previous examples and further comprising a tab positioned at the first end to engage a slot of a heat exchange fluid conduit.

Example 16 is the fin of any or all previous examples wherein the pre-defined flared portions are curved.

Example 17 is the fin of any or all previous examples wherein the fin is manufactured with an extrusion process.

Example 18 is the fin of any or all of the previous examples wherein the fin is subjected to a shaping process after extrusion to impart a heat transfer shape to the fin.

Example 19 is the fin of any or all of the previous exampled wherein the shaping process includes a rolling process.

Example 20 is a method of manufacturing a heat exchanger. The method includes employing an additive manufacturing process to provide at least one heat exchanger fluid conduit. The additive manufacturing process is employed to provide at least one fin having a pre-defined flare portion, wherein the at least one fin and the at least one heat exchanger fluid conduit form a unitary whole. The at least one fin is attached to the at least one heat exchanger fluid conduit at an interface where the pre-defined flare portion is configured to reduce accumulation of debris.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A heat exchanger assembly comprising:
   a first bar plate;
   a second bar plate;
   a plurality of individual discrete fins disposed between the first bar plate and the second bar plate and configured to receive a flow of a heat exchange fluid, each individual discrete fin, of the plurality of individual discrete fins, having a respective first end with a respective first tab that is configured to be received in a respective cooperative slot of the first bar plate, each individual discrete fin, of the plurality of individual discrete fins, having a respective first fillet on a respective first side of each individual discrete fin and a respective second fillet on a respective second side of each individual discrete fin, the respective first tab of each individual discrete fin disposed between the respective first fillet and the respective second fillet of each individual discrete fin.

2. The heat exchanger assembly of claim 1, wherein each individual discrete fin, of the plurality of individual discrete fins, has a respective second end with a respective second tab that is configured to be received in a respective cooperative slot of the second bar plate.

3. The heat exchanger assembly of claim 2, wherein each individual discrete fin, of the plurality of individual discrete fins, has a respective third fillet on the respective first side of each individual discrete fin and a respective fourth fillet on the respective second side of each individual discrete fin.

4. The heat exchanger of claim 3, wherein the respective second tab of each individual discrete fin is disposed between the respective first fillet and the respective second fillet of each individual discrete fin.

5. The heat exchanger of claim 4, wherein each individual discrete fin, of the plurality of individual discrete fins, extends diagonally from the respective first end to the respective second end.

6. The heat exchanger of claim 5, wherein each respective first tab is perpendicular relative to a longitudinal axis of the first bar plate.

7. The heat exchanger of claim 1, wherein each fillet comprises a concave cross-section.

8. The heat exchanger of claim 1, wherein each individual discrete fin, of the plurality of individual discrete fins, are soldered to at least one of the first bar plate and second bar plate.

9. An individual discrete fin for a bar plate heat exchanger assembly, the individual discrete fin comprising:
   a first end;
   a first fillet at the first end and disposed on a first side of the individual discrete fin;
   a second fillet at the first end and disposed on a second side of the individual discrete fin; and
   a first tab disposed at the first end between the first fillet and the second fillet, and configured to be received by a cooperative slot of a first bar plate of the bar plate heat exchanger assembly.

10. The individual discrete fin of claim 9, further comprising:
    a second end;
    a third fillet at the second end and disposed on the first side of the individual discrete fin;
    a fourth fillet at the second end and disposed on the second side of the individual discrete fin; and
    a second tab disposed at the second end between the third fillet and the fourth fillet, and configured to be received by a cooperative slot of a second bar plate of the bar plate heat exchanger assembly.

11. The individual discrete fin of claim 10, wherein the individual discrete fin extends diagonally from the first end to the second end.

12. The individual discrete fin of claim 11, wherein the first tab and the second tab extend from the first end and the second end, respectively, in a direction different from the diagonal direction that the discrete fin extends from the first end to the second end.

13. The individual discrete fine of claim 10, wherein each fillet comprises a concave cross-section.

14. A heat exchanger assembly comprising:
    a first bar plate;
    a second bar plate; and
    a plurality of individual discrete fins, each individual discrete fin comprising:
      a respective first end and a respective second end;
      a respective first fillet at the respective first end and disposed on a respective first side of each individual discrete fin;
      a respective second fillet at the respective first end and disposed on a respective second side of each individual discrete fin;
      a respective third fillet at the respective second end and disposed on the respective first side of each individual discrete fin;
      a respective fourth fillet at the respective second end and disposed on the respective second side of each individual discrete fin;
      a respective first tab disposed at the respective first end between the respective first fillet and the respective second fillet of each individual discrete fin, and configured to be received by a respective cooperative slot of the first bar plate; and a respective second tab disposed at the respective second end between the respective third fillet and the respective fourth fillet of each individual discrete fin, and configured to be received by a respective cooperative slot of the second bar plate.

15. The heat exchanger assembly of claim 14, wherein the respective first tab is disposed equidistantly between the respective first fillet and the respective second fillet of each individual discrete fin.

16. The heat exchanger assembly of claim 15, wherein the respective second tab is disposed equidistantly between the respective third fillet and the respective fourth fillet of each individual discrete fin.

17. The heat exchanger assembly of claim 14, wherein the respective cooperative slot of the first bar plate is laterally offset from the respective cooperative slot of the second bar plate relative to a longitudinal axis of the heat exchanger assembly.

18. The heat exchanger assembly of claim 14, wherein each of the first, second, third and fourth fillets comprise a concave cross-section.

19. The heat exchanger assembly of claim 14, wherein each individual discrete fin, of the plurality of individual discrete fins, extends diagonally from the respective first end to the respective second end.

20. The heat exchanger assembly of claim 19, wherein the respective first tab of each individual discrete fin is perpendicular relative to a longitudinal axis of the first bar plate and the respective second tab of each individual discrete fin is perpendicular relative to a longitudinal axis of the second bar plate.

* * * * *